J. D. HECKARD.
DRIVING MECHANISM.
APPLICATION FILED JULY 12, 1916.
1,213,636. Patented Jan. 23, 1917.
FIG_1_
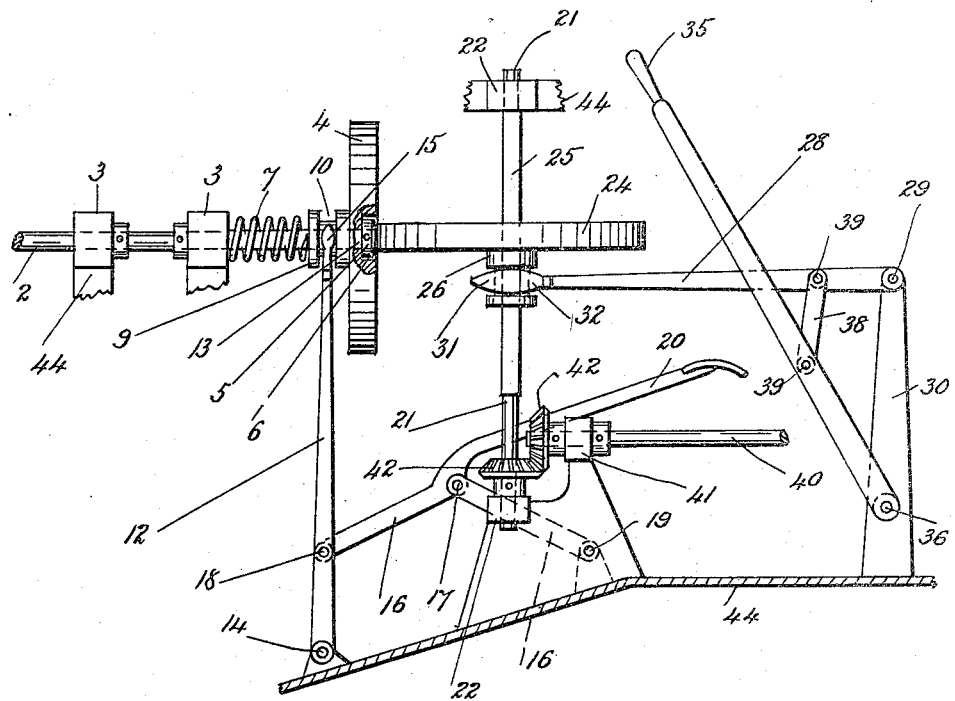
FIG_2_
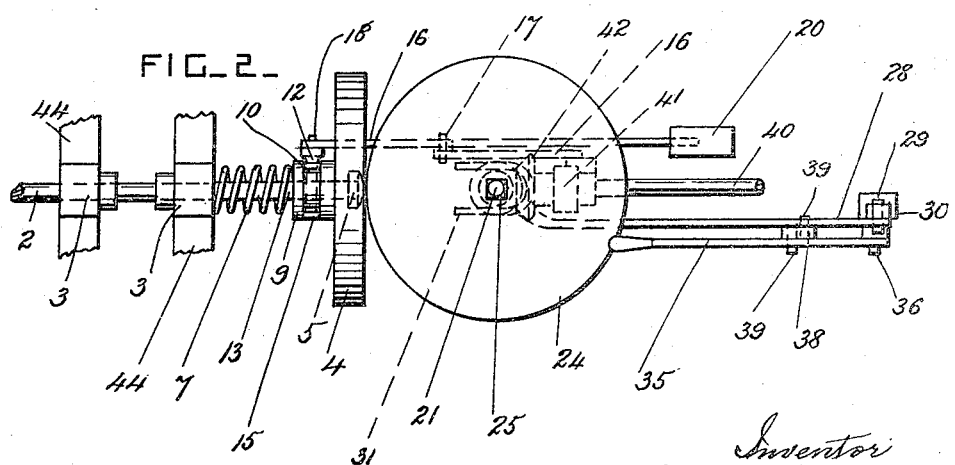
Inventor
Jacob D. Heckard
by Herbert W. Jenner
Attorney

UNITED STATES PATENT OFFICE.

JACOB D. HECKARD, OF ASTORIA, OREGON.

DRIVING MECHANISM.

1,213,636.　　　　　　Specification of Letters Patent.　　Patented Jan. 23, 1917.

Application filed July 12, 1916.　Serial No. 108,922.

*To all whom it may concern:*

Be it known that I, JACOB D. HECKARD, a citizen of the United States, residing at Astoria, in the county of Clatsop and State of Oregon, have invented certain new and useful Improvements in Driving Mechanism; and I do hereby declare the following to be a full, clear, and exact description of the invention, such as will enable others skilled in the art to which it appertains to make and use the same.

This invention relates to driving mechanism more particularly adapted for use in connection with motor cars; and it consists in the novel construction and combination of the parts hereinafter fully described and claimed.

In the drawings, Figure 1 is a side view of a driving mechanism constructed according to this invention. Fig. 2 is a plan view of the same.

The driving shaft 2 is journaled in any suitable bearings, such as 3, and is operatively connected with the engine or motor in any approved manner. A friction driving wheel 4 is mounted to revolve with one end portion of the shaft 2, and to slide longitudinally on it. The portion 13 of the shaft 2 on which the friction wheel 4 slides is square, or the wheel may be splined to the shaft so that it revolves with it.

A cap 5 is secured to the extreme end portion of the shaft 2, and is arranged in a recess 6 in the friction wheel, and has a convex outer face. The friction wheel is pressed toward the cap 5 by a helical spring 7 which encircles the shaft 2, and which is arranged between the bearing 3 and the hub 9 of the friction wheel.

The hub 9 of the friction wheel has a circumferential groove 10, and 12 is a lever pivoted at one end to any convenient part of the car frame by a pin 14. The other end portion 15 of the lever 12 is forked, and it engages with the groove 10 in the wheel hub. Toggle arms 16 are provided and are pivoted together by a pin 17. One toggle arm is pivoted to the lever 12 by a pin 18, and the other toggle arm is pivoted to any convenient part of the car frame by a pin 19. A foot lever or pedal 20 is operatively connected with the toggle arms, and when this foot lever is depressed the toggle arms cause the driving wheel 4 to be retracted against the pressure of the spring 7.

A vertical countershaft 21 is journaled in suitable bearings 22 secured to the car frame, and a friction driven wheel 24 is mounted to revolve with and slide longitudinally upon the shaft 21. The shaft 21 has a square portion 25 for the hub 26 of the wheel 24 to engage with, or the said wheel may be splined on the said shaft. A lever 28 is pivoted at one end by a pin 29 to any convenient part of the car frame, or to a bar or bracket 30 secured to the car frame. The other end portion of the lever 28 has a forked portion 31 which engages with a groove 32 in the hub 26. A hand lever 35 is provided and is pivoted by a pin 36 to the bar or bracket 30 or to any convenient support, and 38 is a link which is pivoted to the levers 35 and 28 by pins 39.

The driven shaft 40 is mounted in suitable bearings 41, and is operatively connected with the ground wheels of the car. Beveled toothed wheels 42 are secured on the countershaft 21 and on the driven shaft 40, and are arranged in gear with each other, but the driven shaft may be operatively connected with the countershaft in any other approved way. Portions 44 of the frame of the car are shown, and as the frame of the car is of any approved construction, it is not more fully illustrated.

The car is driven in different directions by moving the driven wheel from one side of the center of the driving wheel to the other, and its speed in each direction is varied by changing the distance of the driven wheel from the center of the driving wheel, by means of the hand lever. The driving wheel is retracted by the foot lever or pedal when the position of the driven wheel is being changed, so that the change may be made with facility. The helical spring normally holds the driving wheel in frictional driving engagement with the periphery of the driven wheel, and when the driven wheel is placed at the center of the driving wheel the convex face of the cap 5 is pressed against it so that it is not revolved, and so that the car remains stationary without stopping the motor or engine.

What I claim is:

1. In a driving mechanism, a revoluble driving shaft, a friction driving wheel mounted to revolve with and slide longitudinally on the driving shaft, a spring for moving the driving wheel longitudinally of the shaft in one direction, a pivoted lever for moving the said wheel in the reverse direction, toggle arms operatively connected with the said lever and provided with a foot lever or pedal, a countershaft mounted crosswise of the driving shaft, a friction driven wheel mounted to revolve with and slide longitudinally on the countershaft and to engage with the said driving wheel, and hand operated means for sliding the said driven wheel on the said countershaft.

2. In a driving mechanism, a revoluble driving shaft, a friction driving wheel mounted to revolve with and slide longitudinally on the driving shaft, a spring for moving the driving wheel longitudinally of the shaft in one direction, a pivoted lever for moving the said wheel in the reverse direction, toggle arms operatively connected with the said lever and provided with a foot lever or pedal, a vertical counter shaft arranged in front of the said driving shaft, a friction driven wheel mounted to revolve with and slide longitudinally on the countershaft and to engage with the said driving wheel upon opposite sides of its center, a pivoted lever for raising and lowering the driven wheel on the countershaft, a pivoted hand lever, and a link pivotally connecting the two last said levers.

In testimony whereof I have affixed my signature.

JACOB D. HECKARD.